(12) United States Patent
Traiser

(10) Patent No.: US 8,240,916 B2
(45) Date of Patent: Aug. 14, 2012

(54) LINEAR GUIDANCE SYSTEM

(75) Inventor: Reinhold Traiser, Bad Camberg (DE)

(73) Assignee: Accuride International GmbH, Diez (DE)

(*) Notice: Subject to any disclaimer, the term of this patent is extended or adjusted under 35 U.S.C. 154(b) by 29 days.

(21) Appl. No.: 12/733,343

(22) PCT Filed: Aug. 22, 2008

(86) PCT No.: PCT/EP2008/061027
§ 371 (c)(1),
(2), (4) Date: Aug. 23, 2010

(87) PCT Pub. No.: WO2009/027342
PCT Pub. Date: Mar. 5, 2009

(65) Prior Publication Data
US 2010/0316311 A1    Dec. 16, 2010

(30) Foreign Application Priority Data
Aug. 25, 2007   (DE) .......................... 10 2007 040 230

(51) Int. Cl.
*F16C 29/04*    (2006.01)
(52) U.S. Cl. ............................................ 384/49; 384/54
(58) Field of Classification Search ..................... 384/18, 384/45, 49, 51, 54–55, 560, 572, 614, 621
See application file for complete search history.

(56) References Cited

U.S. PATENT DOCUMENTS

| | | | |
|---|---|---|---|
| 2,812,222 A | 11/1957 | Gussack | |
| 3,113,807 A * | 12/1963 | Polidor | 384/49 |
| 3,145,065 A | 8/1964 | Cator | |
| 3,801,166 A * | 4/1974 | York | 384/18 |
| 4,291,929 A * | 9/1981 | Faust | 384/18 |
| 4,629,260 A | 12/1986 | Kasai | |
| 4,655,613 A | 4/1987 | Yokota | |
| 4,921,359 A * | 5/1990 | Sakamoto | 384/18 |
| 4,991,981 A * | 2/1991 | Baxter | 384/18 |
| 5,106,207 A * | 4/1992 | Fry | 384/49 |
| 5,201,584 A * | 4/1993 | Simons | 385/54 |
| 5,553,946 A | 9/1996 | Agari | |
| 6,105,920 A | 8/2000 | Gauger | |
| 6,736,730 B2 * | 5/2004 | Sugiyama et al. | 464/111 |
| 7,178,888 B2 * | 2/2007 | Judge et al. | 312/334.46 |

FOREIGN PATENT DOCUMENTS

| | | |
|---|---|---|
| DE | 4314115 A1 | 11/1994 |
| DE | 29604922 U1 | 5/1996 |
| EP | 0470477 A1 | 2/1992 |
| EP | 0533399 A1 | 3/1993 |
| GB | 738486 | 10/1955 |
| GB | 2213211 A | 3/1989 |

* cited by examiner

*Primary Examiner* — Marcus Charles
(74) *Attorney, Agent, or Firm* — Michael L. Dunn

(57) ABSTRACT

A linear guidance system having a guide rail and a carriage. The carriage is guided displaceably on the guide rail by way of at least two ball bearings, wherein the ball bearings respectively comprise a plurality of balls and a strip-shaped ball cage. The guide rail has running surfaces and the carriage has running surfaces for the rolling movement of the balls of the ball bearings. The ball cage has a plurality of substantially circular through openings which are arranged in succession in a row and into which the balls are inserted, wherein the inside diameter of the through openings tapers conically in the direction from a running surface of the guide rail to the associated running surface of the carriage to an inside diameter or is constricted by limiting means to an inside diameter which is smaller than the diameter of the balls so that the balls are secured in the through openings to prevent them from falling out of the through openings in the direction of the running surface of the carriage.

12 Claims, 3 Drawing Sheets

LINEAR GUIDANCE SYSTEM

CROSS REFERENCE TO RELATED APPLICATIONS

This claims priority from German Patent Application DE 102007040230.0 filed Aug. 25, 2007.

BACKGROUND OF THE INVENTION

The invention concerns a linear guidance system comprising a guide rail and a carriage which is guided displaceably on the guide rail by way of at least two ball bearings, wherein the ball bearings respectively comprise a plurality of balls and a strip-shaped ball cage and the guide rail has running surfaces and the carriage has running surfaces for the rolling movement of the balls of the ball bearings.

Linear guidance systems can be used in the most widely varying areas. Automobile engineering involves the use of linear guidance systems with a high load-bearing capacity inter alia for vehicle sliding doors, load floor pans, variable-length consoles in the vehicle interior and other devices.

In the area of vehicle sliding doors, for reasons of stability guide rails on which the sliding doors are guided are frequently mounted at the outside of the bodywork. Such mounting at the outside of the bodywork admittedly ensures a high stability for the guidance system under the loading of the weight of the sliding door, but the guide rails mounted on the outside of the bodywork are visible when the sliding door is closed and considerably spoil visual appearance. In addition, by virtue of being fitted on the outside of the vehicle, those guide rails are constantly exposed to external weather conditions and therefore corrode more rapidly than internally mounted guidance systems or require a considerably higher level of corrosion protection. In addition such guide rails are profiled so that dirt out of the environment rapidly accumulates at and in the rails and that very rapidly causes a deterioration in the running properties of the guidance system.

A sliding door for motor vehicles having a guide rail mounted on the inside of the door, in which some of the aforementioned disadvantages of guide rails mounted on the outside of the bodywork are overcome is disclosed in DE 43 14 115 A1. The described guidance system for a motor vehicle sliding door however does not have particularly good running properties and thus does not have a good feel and is comparatively noisy.

The object of the present invention is to provide a linear guidance system which can carry high loads, which involves the production of a low level of noise, which is of a compact structure, which permits long displacement travel movements and which is comparatively inexpensive to produce. A further object of the invention is to provide a linear guidance system for vehicle sliding doors, load floor pans, variable-length consoles in the vehicle interior etc, having the aforementioned properties.

BRIEF SUMMARY OF THE INVENTION

Figure 1:
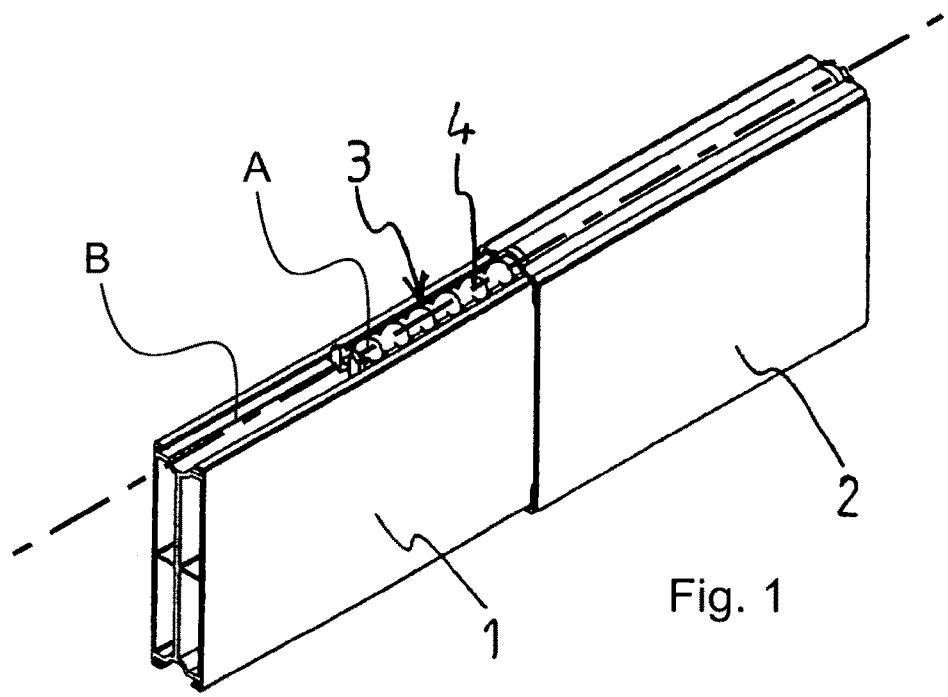
FIG. 1 shows a perspective view inclinedly from above of a linear guidance system according to the invention.

According to the invention that object is attained by a linear guidance system of the kind set forth in the opening part of this specification, which is characterised in that the ball cage has a plurality of substantially circular through openings which are arranged in succession in a row and into which the balls are inserted, wherein the inside diameter of the through openings tapers conically in the direction from a running surface of the guide rail to the associated running surface of the carriage to an inside diameter or is constricted by limiting means to an inside diameter which is smaller than the diameter of the balls so that the balls are secured in the through openings to prevent them from falling out of the through openings in the direction of the running surface of the carriage, the ball cage is elastically deformable and is fixed to the guide rail, and the balls are held by the ball cage with a prestressing against the running surfaces of the guide rail.

More specifically, the invention is preferably a linear guidance system having a guide rail and a carriage. The carriage is guided displaceably on the guide rail by way of at least two ball bearings, wherein the ball bearings respectively comprise a plurality of balls and a strip-shaped ball cage. The guide rail has running surfaces and the carriage has running surfaces for the rolling movement of the balls of the ball bearings, The ball cage has a plurality of substantially circular through openings which are arranged in succession in a row and into which the balls are inserted, wherein the inside diameter of the through openings tapers conically in the direction from a running surface of the guide rail to the associated running surface of the carriage to an inside diameter or is constricted by limiting means to an inside diameter which is smaller than the diameter of the balls so that the balls are secured in the through openings to prevent them from falling out of the through openings in the direction of the running surface of the carriage.

The ball cage is elastically deformable and is fixed to the guide rail, and the balls are held by the ball cage such that they are prestressed against the running surfaces of the guide rail.

DETAILED DESCRIPTION OF THE INVENTION

With the strip-shaped ball cage of the linear guidance system according to the invention the balls are fitted in the through openings and are prevented from falling out upwardly, that is to say in the direction from a running surface of the guide rail towards the associated running surface of the carriage, insofar as either the inside diameter of the through openings is tapered conically to an inside diameter which is smaller than the diameter of the balls, or the inside diameter of the through openings is constricted by limiting means to an inside diameter which is smaller than the diameter of the balls.

In a preferred embodiment provided at the through openings of the ball cage are elastically deformable holding means which are of such a configuration that they secure the balls to prevent them from falling out of the through openings in the direction of the running surface, arranged under the ball cage, of the guide rail, when the balls do not bear against the running surface. As the balls are held with a prestressing against the running surfaces of the guide rail by the ball cage and the upper holding means, that securing effect comes into operation only when the balls do not bear against the running surface, for example upon assembly and storage of the ball cage.

Preferably the elastically deformable holding means, in the direction of the running surface arranged under the ball cage, are in the form of legs which are prestressed elastically towards the center of the through openings. As those holding means are only required when the balls do not bear against the running surface it is sufficient if there are provided one or two such legs at each through opening to secure the ball in the through opening to prevent it from falling out. It will be appreciated that it is also possible to provide a plurality of such legs. Upon assembly of the ball cage, namely when inserting the balls into the through openings in the ball cage, the balls are inserted into the ball cage from below, in which case the holding means or legs are temporarily urged apart so that a ball can be inserted.

The strip-shaped ball cage according to the invention is simple and inexpensive to produce and fit to the guide rail and affords good running properties for the linear guidance system. The length of the ball cage and the number of balls and through openings arranged therein substantially depends on the overall length of the guidance system and the displacement travel movement, but also on the required load-bearing capacity of the linear guidance system, the desired feel and smoothness and quietness of running operation.

A further essential feature of the linear guidance system according to the invention is that the balls are held with a prestressing by the ball cage against the running surfaces of the guide rail. That ensures that the balls always bear against the running surfaces of the guide rail, thereby avoiding chattering and rattling and troublesome noise generation on the part of the ball bearing, for example when vibration occurs, and more specifically even with balls which are precisely not under a loading between the running rail and the carriage. To ensure the prestressing effect the ball cage is elastically deformable or flexible.

In a preferred embodiment of the linear guidance system according to the invention the side edges in the longitudinal extent of the strip-shaped ball cage engage into two grooves disposed in mutually opposite relationship in the longitudinal extent of the guide rail for securing the ball cage to the guide rail. For that purpose, besides the running surfaces of the guide rail, there are provided two grooves which face towards each other with their openings. The side edges of the strip-shaped ball cage are introduced into those grooves. In that case the arrangement of the grooves is so selected that the ball cage is slightly bent upon fixing transversely with respect to its longitudinal axis and by virtue of its flexibility or elasticity always urges the balls with a prestressing against the running surface of the guide rail. Desirably therefore the strip-shaped ball cage is made from a flexible elastic material, preferably plastic material. It can however also be made from metal, for example steel or high-quality steel.

In a quite particularly preferred embodiment of the linear guidance system according to the invention the guide rail on two mutually opposite sides has respectively one running surface and one ball bearing. Alternatively however it is also possible to provide on the guide rail more than two running surfaces and two ball bearings, for example two running surfaces and two ball bearings on each side of the guide rail. For most applications however it is sufficient if there is respectively precisely one running surface and one ball bearing provided on each of the oppositely disposed sides of the guide rail.

The overall length of the linear guidance system is substantially predetermined by the length of the guide rail. The carriage guided displaceably on the guide rail is considerably shorter than the guide rail. The maximum displacement travel is determined by the overall length of the guide rail and the ratio of the length of the carriage to the length of the guide rail. With a given length for the guide rail the maximum possible displacement travel for an object secured to the carriage is correspondingly longer, the shorter the carriage is. The selection of the length of the carriage guided displaceably on the guide rail is determined however not only in accordance with the desired displacement travel but also in accordance with the required load-bearing capacity and stability of the linear guidance system. The longer the carriage is, the correspondingly higher are the load-bearing capacity, running stability and quietness and smoothness of operation, as, with a ball bearing of the same configuration, a longer carriage is rolled at the same time on more balls than a shorter carriage.

Desirably the carriage includes a profile member which is substantially C-shaped in cross-section and the respective end portions of which have running surfaces and embrace the guide rail in the region of the ball bearings. In a particularly preferred embodiment of the linear guidance system according to the invention the carriage further includes a plate which extends between the end portions of the substantially C-shaped profile member of the carriage and is connected to the end portions non-releasably or releasably, preferably non-releasably, particularly preferably by means of a welded connection. The C-shaped profile member and the plate secured to the end portions thereof thus embrace the guide rail completely like a profile member closed in a tubular configuration. Closure of the C-shaped profile member of the carriage to constitute a tubular profile member by means of the plate connected to the end portions of the C-shaped profile member achieves a very high loading value and extremely good torsional stability for the linear guidance system. The use of a plate for connecting the respective end portions of the C-shaped profile member of the carriage has the further advantage that tolerances of the individual parts, which occur in production of the linear guidance system, can be compensated when connecting the plate to the end portions of the C-shaped profile member. When the plate is connected to the end portions of the C-shaped profile member, the C-shaped profile member can be compressed to a greater or lesser degree to compensate for tolerances and remains in that position after the plate is connected to the end portions. It is possible in that way to compensate both for tolerances in manufacture of the C-shaped profile member of the carriage and also tolerances in manufacture of the guide rail.

In a further preferred embodiment of the linear guidance system according to the invention the strip-shaped ball cage in its longitudinal extent at least portion-wise and preferably over its entire length has at least one torsion groove (groove-shaped opening). Preferably the at least one torsion groove is arranged on the side of the ball cage, that is towards the running surfaces of the guide rail. That at least one torsion groove influences or alters the elastic flexibility of the strip-shaped ball cage transversely to its longitudinal axis. The prestressing force of the balls against the running surfaces of the guide rail can be varied or adjusted, by the width and depth of the at least one torsion groove. A further advantage of the at least one torsion groove is that it can serve as a storage chamber for a lubricant which is usually employed in relation to ball bearings.

In a further preferred embodiment of the linear guidance system according to the invention the strip-shaped ball cage, on the side remote from the running surfaces of the guide rail, has a plurality of knob-shaped raised portions arranged in succession in a row and in the proximity of the side edges in the longitudinal extent of the ball cage. Those knob-shaped raised portions have a number of advantages. The rolling movement of the balls on the running surface of the guide rail upon displacement of the carriage provides that the entire ball cage is also entrained or displaced in the longitudinal direction of the guide rail. The knob-shaped raised portions in the proximity of the side edges of the strip-shaped ball cage reduce the contact area of the regions of the side edges within the grooves provided on the guide rail for holding the ball cage, and thus the frictional resistance. In addition the knob-shaped raised portions provide for good distribution of lubricant which is desirably provided in the grooves on the guide rail for easier displacement of the ball cage.

In a further preferred embodiment the strip-shaped ball cage, at its two end portions, has end abutments which are of such a configuration that the carriage cannot be displaced beyond an end of the ball cage but encounters the end abutment upon reaching an end of the ball cage. When that occurs and if the end of the guide rail has not yet been reached in the displacement of the carriage the carriage pulls or entrains the ball cage to the end of the displacement travel. The end abutments at the respective ends of the ball cage ensure that the carriage always remains with its full length over the ball cage and is not displaced therebeyond. That improves stability, running properties and load-bearing capacity of the guidance system according to the invention.

Further advantages, features and configurations of the linear guidance system according to the invention will be apparent from the description hereinafter of a preferred embodiment and the accompanying Figures.

Figure 2:
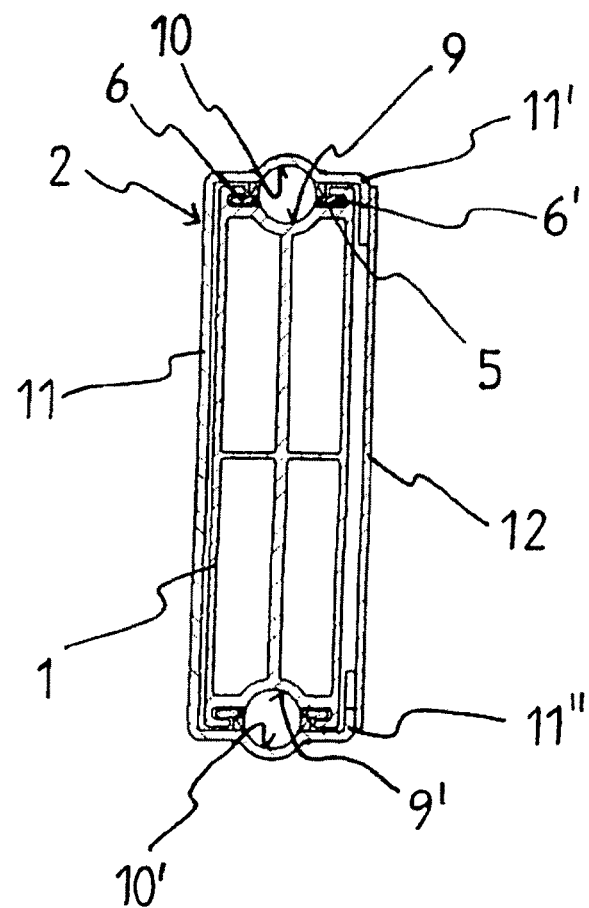
FIG. 2 shows a view in cross-section in relation to its longitudinal extent of a linear guidance system according to the invention.

FIG. 1 shows a perspective view inclinedly from above of a particularly preferred embodiment of the linear guidance system according to the invention comprising a guide rail 1, a carriage 2 and two ball bearings 3 and 3'. As shown in FIG. 2 the guide rail 1 in this embodiment which is particularly preferred according to the invention is produced in the form of a profile member produced by extrusion, preferably comprising aluminum. The guide rail 1 is of a substantially box-shaped profile having cavities and stabilisation struts in its interior. Running surfaces 9 and 9' are arranged on two opposite sides of the guide rail. The profile member extends further laterally of the running surfaces forming mutually facing grooves 6 and 6', into which the side edges of the ball cage 5 engage. The ball cage 5 is equipped with balls 4 which are secured upwardly against falling out by the inside diameter of the through openings tapering conically. The ball cage 5 holds the balls 4 with a prestressing against the running surfaces 9 and 9' of the guide rail 1.

It can further be clearly seen from FIG. 2 that the carriage 2 comprises a substantially C-shaped profile member 11 with running surfaces 10 and 10' and a plate 12 connected to the end portions 11' and 11" of the C-shaped profile member 11. The plate 12 is welded to the end portions 11' and 11" of the C-shaped profile member 11. It can be seen from FIG. 1 that the plate 12 is an apertured plate. The apertured plate 12 can be used for securing an object to be displaced, when the guide rail is mounted stationarily. Alternatively the carriage 2 can be secured by way of the apertured plate stationarily and the guide rail 1 can be secured to an object to be displaced such as for example a vehicle sliding door. The guide rail is usually secured by way of connecting portions fixed to the respective ends of the guide rail (not shown).

Figure 3A:
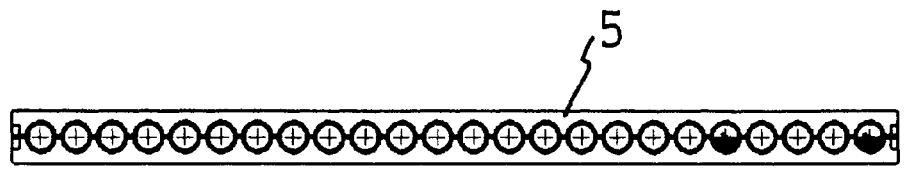
FIG. 3a shows a view from below for the strip shaped ball cage.
Figure 3B:
FIG. 3b shows a side view of the strip shaped ball cage.
Figure 3C:
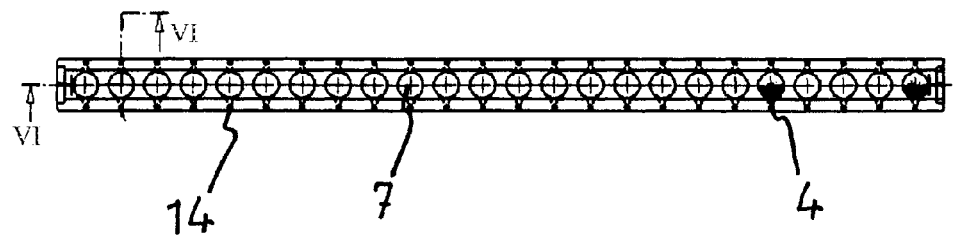
FIG. 3c shows a top view of the strip shaped ball cage

FIG. 3a shows the strip-shaped ball cage 5 from a bottom view. FIG. 3b shows the strip shaped ball cage from a side view and FIG. 3c shows the strip shaped ball cage from a top view. In these in these views only two balls 4 are arranged in the through openings 7. It will be appreciated that, in a completely assembled linear guidance system, a ball 4 is provided in each or at least most of the through openings 7.

Figure 4:
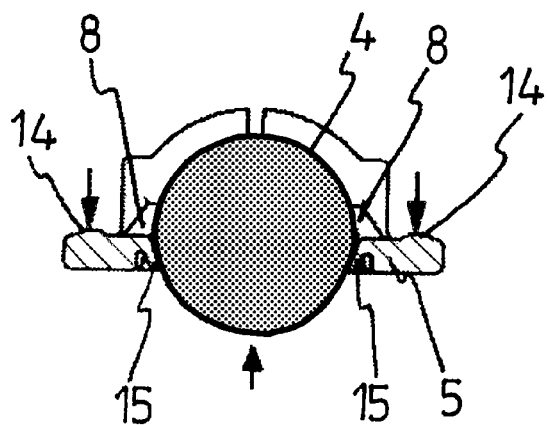
FIG. 4 shows a cross-section through the strip-shaped ball cage of FIG. 3 along section line IV-IV.

FIG. 4 shows a cross-sectional view on an enlarged scale of the ball cage 5 of FIG. 3 along the section line IV-IV. The conical tapering of the inside diameter of the through opening 7 and the holding means 15 in the form of elastic legs 15' and 15" can be clearly seen herein. The conically tapered wall surface 8 of the through opening bears against the ball above the central plane of the ball and the holding means 15 bear against the ball beneath the central plane thereof and thus prevent the ball from falling out of the through opening 7.

It can also be clearly seen from FIG. 4 that knob-shaped raised portions 14 are arranged on the ball cage 5 in the proximity of the side edges. The lower view in FIG. 3 shows that the knob-shaped raised portions 14 are arranged in succession in a row and at uniform spacings on the top side of the ball cage 5. The knob-shaped raised portions 14 reduce the contact area of the ball cage in the grooves 6 and 6' on the guide rail 1 and thus reduce the frictional resistance.

Figure 5:
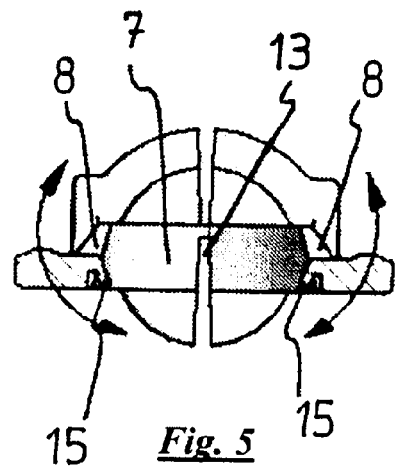
FIG. 5 shows a cross-section through the strip-shaped ball cage of FIG. 3 along section line V-V.

FIG. 5 shows a cross-section through the ball cage 5 in FIG. 3 along the section line V-V. FIG. 5 shows essentially the same sectional view as FIG. 4 but without a ball fitted into the sectioned through opening 7.

As shown in FIG. 5 the ball cage 5, on the underside, has a torsion groove 13 (groove-shaped opening) which extends substantially over the entire length of the ball cage and which influences the flexibility and elasticity of the ball cage transversely with respect to its longitudinal extent. Thus the prestressing (prestressing force) of the balls against the running surfaces 9 and 9' of the guide rail 1 can be varied or adjusted by the selection of the width and depth of the torsion groove 13. In the present description reference is made to a torsion groove although that extends through the through openings of the ball cage and no longer actually represents a groove in the through openings. It would equally be possible also to refer to many individual (small) torsion grooves which extend in the longitudinal direction of the ball cage in the regions between adjacent through openings.

Figure 6:
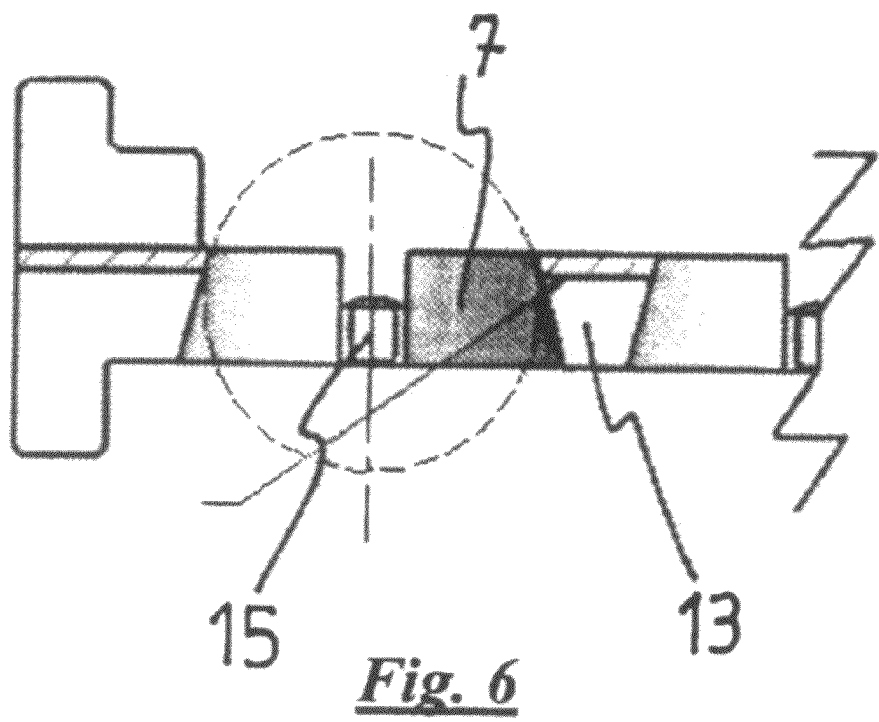
FIG. 6 shows a cross-section through the strip-shaped ball cage of FIG. 3 along section line VI-VI

FIG. 6 shows a section through the strip-shaped ball cage of FIG. 3 along the section line VI-VI. It is also possible to clearly see in FIGS. 3 through 6 the end abutments which project upwardly beyond the end portions of the strip-shaped ball cage and which are of such a configuration that the carriage cannot be displaced beyond an end of the ball cage. The following references numbers and letters are used in the specification.

A longitudinal extent of the strip-shaped ball cage (5)
B longitudinal extent (B) of the guide rail
1 guide rail
2 carriage
3, 3' ball bearing
4 balls
5 ball cage
5', 5" side edges of the strip-shaped ball cage 5
6, 6' grooves
7 through openings
8 tapered walls of the through openings
9, 9' running surfaces of the guide rail 1
10, 10' running surfaces of the C-shaped profile member 11
11 C-shaped profile member
11', 11" end portions of the C-shaped profile 11
12 plate 13 torsion groove
14 knob-shaped raised portions
15 holding means

The invention claimed is:

1. A linear guidance system comprising a guide rail (1) and a carriage (2) which is guided displaceably on the guide rail by way of at least two ball bearings (3, 3'), wherein the ball bearings respectively comprise a plurality of balls (4) and a strip-shaped ball cage (5) and the guide rail (1) has running surfaces (9, 9') and the carriage (2) has running surfaces (10, 10') for the rolling movement of the balls (4) of the ball bearings (3, 3'),
wherein
the ball cage (5) has a plurality of substantially circular through openings (7) which are arranged in succession in a row and into which the balls (4) are inserted, wherein the inside diameter of the through openings tapers conically in the direction from a running surface (9, 9') of the guide rail to the associated running surface (10, 10') of the carriage (2) to an inside diameter or is constricted by limiting means to an inside diameter which is smaller than the diameter of the balls so that the balls are secured in the through openings (7) to prevent them from falling out of the through openings (7) in the direction of the running surface (10, 10') of the carriage,
the ball cage (5) is elastically deformable and is fixed to the guide rail (1), and
the balls (4) are held by the ball cage (5) such that they are prestressed against the running surfaces (9, 9') of the guide rail and wherein along at least a portion of a longitudinal extent of the ball cage (5) at least one torsion groove (13) is provided which is arranged on a side of the ball cage (5), that is towards the running surfaces (9, 9') of the guide rail (1).

2. A linear guidance system as set forth in claim 1 wherein elastically deformable holding means (15) are provided at the through openings (7) of the ball cage (5), which elastically deformable holding means (15) are of such a configuration that they secure the balls to prevent them from falling out of the through openings (7) in the direction of the running surface (9, 9'), of the guide rail, when the balls (4) do not bear against the running surface (9, 9').

3. A linear guidance system as set forth in claim 2 wherein side edges (5', 5") in a longitudinal extent (A) of the strip-shaped ball cage (5) engage into two grooves (6, 6') disposed in mutually opposite relationship in a longitudinal extent (B) of the guide rail (1) for securing the ball cage (5) to the guide rail.

4. A linear guidance system as set forth in claim 3 wherein the strip-shaped ball cage (5), on a side remote from the running surfaces (9, 9') of the guide rail (1), has a plurality of knob-shaped raised portions (14) arranged in succession in a row and in the proximity of the side edges in a longitudinal extent of the ball cage (5).

5. A linear guidance system as set forth in claim 1 wherein the strip-shaped ball cage (5) is made from plastic material.

6. A linear guidance system as set forth in claim 1 wherein side edges (5', 5") in a longitudinal extent of the strip-shaped ball cage (5) engage into two grooves (6, 6') disposed in mutually opposite relationship in a longitudinal extent of the guide rail (1) for securing the ball cage (5) to the guide rail.

7. A linear guidance system as set forth in claim 1 wherein the guide rail (1) on two mutually opposite sides has respectively precisely one running surface (9, 9') and one ball bearing.

8. A linear guidance system as set forth in claim 1 wherein the carriage (2) includes a profile member (11) which is substantially C-shaped in cross-section and the respective end portions (11', 11") of which have running surfaces (10, 10') and embrace the guide rail (1) in the region of the ball bearings.

9. A linear guidance system as set forth in claim 8 wherein the carriage (2) further includes a plate (12) which extends between the end portions (11', 11") of the substantially C-shaped profile member (11) of the carriage (2) and is non-releasably or releasably connected to the end portions (11', 11").

10. A linear guidance system as set forth in claim 9 wherein the carriage (2) further includes a plate (12) which extends between the end portions (11', 11") of the substantially C-shaped profile member (11) of the carriage (2) and is non-releasably connected to the end portions (11', 11").

11. A linear guidance system as set forth in claim 10 wherein the carriage (2) further includes a plate (12) which extends between the end portions (11', 11") of the substantially C-shaped profile member (11) of the carriage (2) and is connected to the end portions (11', 11") by means of a welded connection.

12. A linear guidance system as set forth in claim 1 wherein the strip-shaped ball cage (5), on a side remote from the running surfaces (9, 9') of the guide rail (1), has a plurality of knob-shaped raised portions (14) arranged in succession in a row and in the proximity of the side edges in a longitudinal extent of the ball cage (5).

* * * * *